United States Patent
Fritsch et al.

(10) Patent No.: US 10,787,944 B2
(45) Date of Patent: Sep. 29, 2020

(54) METHOD FOR OPTIMIZING NITROGEN OXIDE EMISSIONS AND CARBON DIOXIDE EMISSIONS OF A COMBUSTION ENGINE

(71) Applicant: Robert Bosch GmbH, Stuttgart (DE)

(72) Inventors: Andreas Fritsch, Waiblingen (DE); Daniel Michael Ruff, Ellhofen (DE)

(73) Assignee: Robert Bosch GmbH, Stuttgart (DE)

(*) Notice: Subject to any disclaimer, the term of this patent is extended or adjusted under 35 U.S.C. 154(b) by 38 days.

(21) Appl. No.: 16/174,748

(22) Filed: Oct. 30, 2018

(65) Prior Publication Data

US 2019/0128163 A1    May 2, 2019

(30) Foreign Application Priority Data

Oct. 30, 2017 (DE) .................. 10 2017 219 408

(51) Int. Cl.
  F01N 3/08    (2006.01)
  F01N 3/20    (2006.01)
  F01N 9/00    (2006.01)

(52) U.S. Cl.
  CPC ......... *F01N 3/0885* (2013.01); *F01N 3/0814* (2013.01); *F01N 3/0842* (2013.01); *F01N 3/2006* (2013.01); *F01N 3/2066* (2013.01); *F01N 9/00* (2013.01); F01N 2570/10 (2013.01); F01N 2570/14 (2013.01); F01N 2900/0601 (2013.01); F01N 2900/102 (2013.01); F01N 2900/1402 (2013.01)

(58) Field of Classification Search
CPC combination set(s) only.
See application file for complete search history.

(56) References Cited

U.S. PATENT DOCUMENTS

| | | | | |
|---|---|---|---|---|
| 9,909,481 B2* | 3/2018 | Sun | ......... | F01N 9/005 |
| 10,060,373 B2* | 8/2018 | Wang | ......... | F02D 41/1406 |
| 2011/0264353 A1* | 10/2011 | Atkinson | ......... | F02D 41/1402 701/102 |
| 2012/0022728 A1* | 1/2012 | Hall | ......... | B60L 50/61 701/19 |
| 2012/0055138 A1* | 3/2012 | Sloane | ......... | B01D 53/9495 60/274 |
| 2016/0160787 A1* | 6/2016 | Allain | ......... | F02D 41/1401 701/103 |
| 2018/0112580 A1* | 4/2018 | Suljanovic | ......... | G01M 15/10 |

FOREIGN PATENT DOCUMENTS

DE    102016215386    2/2018

* cited by examiner

*Primary Examiner* — Binh Q Tran
(74) *Attorney, Agent, or Firm* — Michael Best & Friedrich LLP

(57) ABSTRACT

A method for simultaneous optimization of nitrogen oxide emissions and carbon dioxide emissions of a combustion engine with an exhaust gas aftertreatment system of a motor vehicle. The method comprises the following steps: at the start a prediction horizon (PH) is selected (100), then a nitrogen oxide limit value ($m_{NOx\_max}$) is specified (101). Minimisation (102) of a cost function (K) comprising the nitrogen oxide emissions and the carbon dioxide emissions is carried out, wherein the nitrogen oxide limit value ($m_{NOx\_max}$) is complied with. Then actuators of the combustion engine are set (105) to a setpoint value (S) that is determined when minimizing (102) the cost function (K). Finally, the steps of the method are repeated.

13 Claims, 4 Drawing Sheets

METHOD FOR OPTIMIZING NITROGEN OXIDE EMISSIONS AND CARBON DIOXIDE EMISSIONS OF A COMBUSTION ENGINE

BACKGROUND OF THE INVENTION

The present invention concerns a method for the simultaneous optimization of the nitrogen oxide emissions and the carbon dioxide emissions of a combustion engine. The invention further concerns a computer program that carries out each step of the method when run on a computing device, and a machine-readable storage medium that stores the computer program. Finally, the invention concerns an electronic control unit that is arranged to carry out the method according to the invention.

It is required nowadays to simultaneously reduce a plurality of different types of harmful emissions of a combustion engine—above all particles, oxides of nitrogen (NOx) and carbon dioxide (C02). The carbon dioxide emissions of a combustion engine depend strongly on the amount of fuel combusted, so that this is to be reduced—also regarding resource-saving and cost-saving. Measures that bring about an increase in the combustion efficiency, and hence a reduction in carbon dioxide emissions, in general cause an increase in the engine's nitrogen oxide emissions and vice-versa. In motor vehicles, exhaust gas aftertreatment systems are used to reduce the harmful emissions of combustion engines. In the case of diesel engine drives, oxides of nitrogen are mainly reduced by means of the SCR method (Selective Catalytic Reduction) or using NOx storage catalytic converters (NSC). The nitrogen oxide reduction efficiency, i.e. the reducible nitrogen oxide mass in relation to the additional carbon dioxide mass to be applied for this, depends to a great extent on specific boundary conditions, such as the current traffic situation and the individual driving behaviour of the driver.

Methods are known with which the setpoint values for the actuators of combustion engines are produced by means of two-dimensional characteristic fields as a function of a load on the combustion engine and/or a revolution rate of the combustion engine. In this way, the emissions of a combustion engine are implicitly controlled. Further parameters, such as for example ambient conditions, the temperature of the combustion engine, the temperature of the catalytic converter(s) and/or further system states may be taken into account. Moreover, correction functions can be provided in the transient engine mode. In summary, the characteristic fields are objectively adapted to the respective combustion engines.

SUMMARY OF THE INVENTION

The method concerns a combustion engine of a motor vehicle that is connected to an exhaust gas aftertreatment system. The exhaust gas aftertreatment system is arranged to reduce the harmful emissions of the combustion engine and comprises in particular an SCR catalytic converter and/or a nitrogen oxide storage catalytic converter (NSC).

The method provides the simultaneous optimization of nitrogen oxide emissions and carbon dioxide emissions of the combustion engine. During said simultaneous optimisation, the nitrogen oxide emissions and the carbon dioxide emissions are mutually dependently reduced as much as possible, wherein a predictive model control concept is used. The following steps are carried out for the method:

At the start, a prediction horizon is selected. The prediction horizon is a time window that starts at the current point in time and extends to a finite point in time in the future. Within the prediction horizon, information is obtained about future values and/or influencing variables, such as for example the nitrogen oxide emissions and the carbon dioxide emissions and/or other harmful emissions, the temperature of the combustion engine, the temperature of the exhaust gas and/or the temperature(s) of the catalytic converter(s), one or more exhaust gas mass flows, the speed of the motor vehicle etc. The data can be predicted by various methods and tools, such as for example one or more of the following:

A prediction based on navigation data;

a prediction based on sensor data for detecting the surroundings of the vehicle, such as for example cameras, ultrasound, radar, lidar etc.;

a prediction based on communications between the motor vehicle and the surroundings and/or other vehicles;

a prediction based on current and/or past measurement values and/or model values, such as for example statistical methods for (online) data analysis.

According to one aspect, the prediction horizon can be based on a specifiable period of time. This means that for the time-based prediction horizon, a fixed period of time can be specified for the time window. Consequently, the period of time for the prediction horizon remains the same during a journey. According to a further aspect, the prediction horizon can be based on a specifiable length of a route, from which it is assumed that the motor vehicle is travelling said route. In order to determine the route, the aforementioned method and tools for predicting the data can be used, above all the navigation data and/or stored data about preferred routes. For the route-based prediction horizon, the length of the route can be converted into a period of time by using the average speed of the motor vehicle and/or by using a speed that vis to be expected over the route. The speed to be expected can also be determined by using the aforementioned data. Moreover, data about a speed limit and/or about the traffic on said route can also be incorporated. Consequently, the period of time of the prediction horizon changes as a function of the aforementioned data. A plurality of prediction horizons is preferably determined, in particular both time-based and route-based prediction horizons. If a plurality of prediction horizons is determined, the prediction horizon is preferably selected that ends the furthest into the future.

In addition, a nitrogen oxide limit value is determined. The nitrogen oxide limit value is advantageously oriented towards legal requirements and is 80 mg/km in Europe, for example. Said nitrogen oxide limit value applies as a boundary condition for optimization and may not be exceeded during optimization. Furthermore, the nitrogen oxide limit value can exist in a dynamic form, in order for example to ensure particularly low nitrogen oxide emissions in towns, whereas there is more leeway for the minimization of carbon dioxide for cross-country and motorway journeys owing to higher nitrogen oxide limit values.

A cost function is minimized with the model-predictive control. The cost function comprises the nitrogen oxide emissions and the carbon dioxide emissions of the combustion engine as cost factors. The weighting between the raw engine nitrogen oxide emissions and the carbon dioxide emissions is expressed by means of a weighting factor and the weighting can be varied by the weighting factor. According to one aspect, the weighting factor is incorporated in the cost function. According to a further aspect, a correction factor for adapting a regeneration strategy for a nitrogen oxide storage catalytic converter (NSC) is incorporated in the cost function. The regeneration of the nitrogen oxide storage catalytic converter, which must be carried out at a later point in time after nitrogen oxide has been stored therein and then results in an increase in the carbon dioxide emissions, is adjusted by means of the correction factor. The preceding regenerations of the nitrogen oxide storage catalytic converter are preferably incorporated in the cost function, in particular in the form of an average value. According to yet another aspect, an indicator for requesting heating measures for the catalytic converters is incorporated in the cost function. With this the temperature of the catalytic converters is changed in a heating phase. On the one hand measures to increase the exhaust gas temperature or the exhaust gas enthalpy of the combustion engine and/or a fuel mass exothermally converted by means of the exhaust system, and on the other hand an electric heating element are controlled for this purpose. The temperature of the catalytic converters influences the efficiency thereof, so that the nitrogen oxide emissions can be adjusted.

A model of the route to be controlled is used in order to estimate the effect of a variation of the weighting factor between the nitrogen oxide emissions and the carbon dioxide emissions and/or an adjustment of the regeneration strategy for the nitrogen oxide storage catalytic converter and/or the performance of heating measures for the catalytic converters in respect of emissions to be expected while taking into account future anticipated driving states at the end of the prediction horizon. For example, the exhaust gas mass flow, the efficiency of the catalytic converter(s) and/or the temperature of the combustion engine, the temperature of the exhaust gas and/or the temperature of the exhaust gas aftertreatment system, i.e. in particular the temperature(s) of the catalytic converter(s), can be incorporated as model inputs for calculating the expected emissions. In this case, various types of model, such as for example data-based models, i.e. for example characteristic fields, neural networks etc., physical models and/or phenomenological models, can be used.

In a further step, the cost function is minimized as a function of the weighting factor and/or the correction factor for adjustment of the regeneration strategy for the nitrogen oxide catalytic converter and/or the indicator for requesting heating measures of the catalytic converters. In this case, in particular the variable to be minimized is the carbon dioxide emissions, whereas the nitrogen oxide emissions must satisfy the restriction imposed by the nitrogen oxide limit value. A total of the nitrogen oxide emissions, i.e. the total discharged nitrogen oxide mass, may not exceed the nitrogen oxide limit value. In detail, the total nitrogen oxide emissions consist of nitrogen oxide emissions discharged up to this point in time, which for example can be calculated by continuous integration of the measurement values of a NOx sensor at the outlet of an exhaust system of the combustion engine or by the integration of model values, and of the expected additional nitrogen oxide emissions estimated from the model of the model-predictive control. According to one aspect, the nitrogen oxide limit value can be taken into account in the cost function in the form of a penalty term. If the nitrogen oxide limit value is not exceeded, the penalty term adopts a first value, in particular zero. If the nitrogen oxide limit value is exceeded, then the penalty term adopts a second value that is greater than the first value. The magnitude of the second value is preferably selected to significantly exceed the other variables in the corresponding cost function, for which reason the corresponding cost function adopts such a large value that the corresponding control strategy, which causes a violation of the limit value, is reliably excluded for the minimization.

The minimization of the cost function can be carried out using a known algorithm, in particular using the Bellman optimality principle. For this purpose, one or more of the following algorithms can preferably be used:
    policy iteration; and/or
    value iteration; and/or
    dynamic programming; and/or
    a rollout-algorithm.
Alternatively, the minimization of the cost function can be carried out using a shooting method.

As a result, during the model-predictive control of the route to be traveled, the driving situation and the individual driving style are taken into account. The combustion engine and the exhaust gas aftertreatment system can thus be controlled in a goal-oriented manner and as required and can thus be adjusted to said conditions in a timely manner, whereby the harmful emissions are reduced.

An optimum control strategy for the current point in time is concluded from the minimization of the cost function. This contains the optimum weighting factor and/or the optimum correction factor for adjustment of the regeneration strategy for the nitrogen oxide catalytic converter and/or the optimum indicator for requesting heating measures for the catalytic converters with which the carbon dioxide emissions is lowest, and the nitrogen oxide limit value is complied with. Finally, actuators of the combustion engine are adjusted to setpoint values determined during minimization of the cost function according to the optimum control strategy. Consequently, the catalytic converter effectiveness to be expected in the future and the harmful emissions to be expected are taken into account when forming setpoint values for the actuators using the model-predictive control.

Optionally, it can be provided to repeat all the aforementioned steps of the method or only individual steps of the method in a next time step based on the new system state in order to optimise the nitrogen oxide emissions and the carbon dioxide emissions. Moreover, the setpoint values for the actuators can be additionally corrected in order to achieve a desired system behaviour under defined boundary conditions.

The computer program is arranged to carry out each step of the method, in particular when it is carried out on a computing device or control unit. It enables the implementation of the method in a conventional electronic control unit without having to carry out structural changes thereto. For this purpose, it is stored on the machine-readable storage medium.

By running the computer program on a conventional electronic control unit, an electronic control unit is obtained that is arranged to carry out optimization of nitrogen oxide emissions and carbon dioxide emissions.

BRIEF DESCRIPTION OF THE DRAWINGS

Exemplary embodiments of the invention are described in detail in the drawings and in the following description.

DETAILED DESCRIPTION

Figure 1:
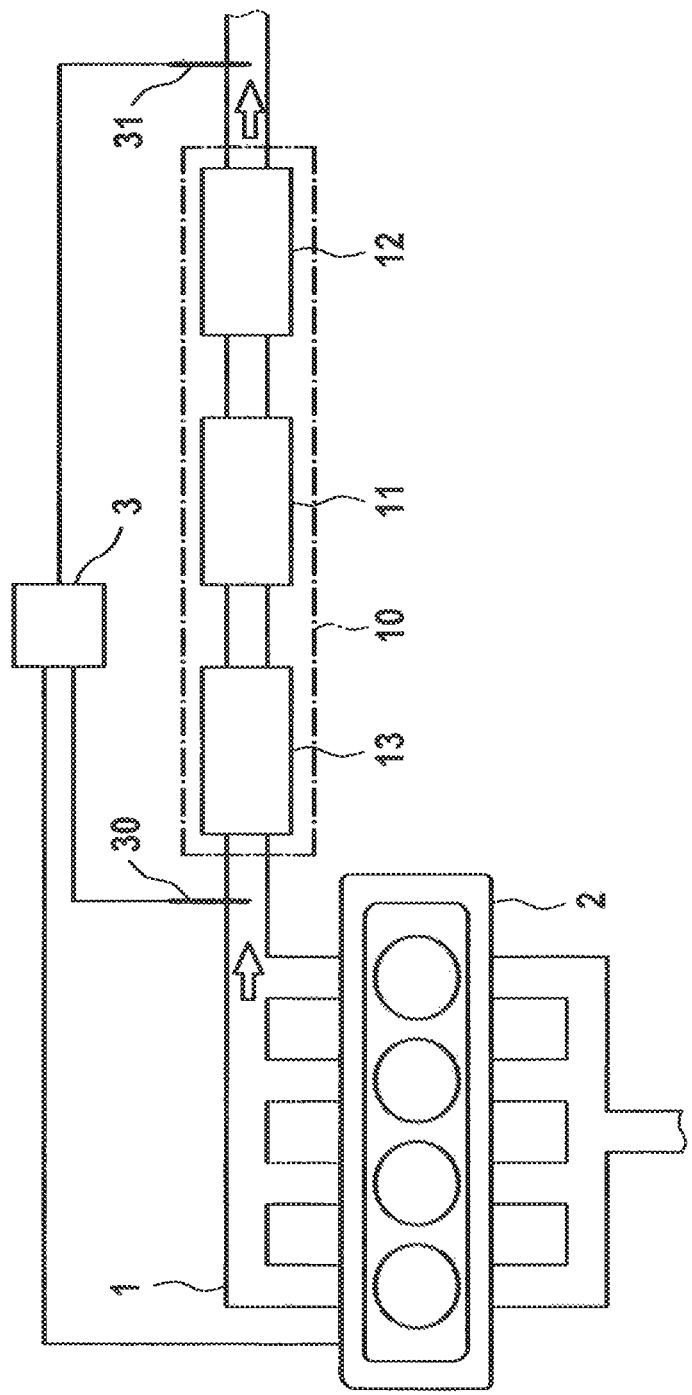
FIG. 1 shows a schematic representation of a combined exhaust gas aftertreatment system that can be controlled by means of an exemplary embodiment of the method according to the invention.

FIG. 1 shows schematically an exhaust system 1 that is connected to a combustion engine 2 for a motor vehicle that is not shown. The combustion engine produces exhaust gas that is discharged through the exhaust system 1. Furthermore, FIG. 1 represents a combined exhaust gas aftertreatment system 10 that is disposed in the exhaust system 1 and that is arranged to treat the exhaust gas in the exhaust system 1. For this purpose, the combined exhaust gas aftertreatment system 10 comprises a nitrogen oxide storage catalytic converter 11 that stores oxides of nitrogen (NOx), a SCR catalytic converter 12 that reduces the oxides of nitrogen in the exhaust gas, and a diesel oxidation catalytic converter 13. Here it should be remarked that in other exemplary embodiments the exhaust gas aftertreatment system 10 can comprise fewer catalytic converters and the order of the catalytic converters 11, 12, 13 can vary. The exact manner of operation of said components will not be described in detail here in order not to divert from the focus of this invention. The exhaust gas flows out of the combustion engine 2 through the exhaust system 1 into the combined exhaust gas aftertreatment system 10, where the nitrogen oxide component is reduced by the nitrogen oxide storage catalytic converter 11 and the SCR catalytic converter 12, and then exits the exhaust gas aftertreatment system 10 via the exhaust system 1.

Moreover, two nitrogen oxide sensors 30 and 31 are disposed in the exhaust system 1. A first nitrogen oxide sensor 30 is disposed between the combustion engine 2 and the exhaust gas aftertreatment system 10 and is arranged to measure the nitrogen oxide raw emissions of the combustion engine 2. A second nitrogen oxide sensor 31 is disposed downstream of the exhaust gas aftertreatment system 10 and measures a nitrogen oxide value of the treated exhaust gas there. The two nitrogen oxide sensors 30 and 31 are connected to a control unit 3 and provide thereto information about the NOx content of the exhaust gas. Moreover, the control unit 3 is arranged to control the combined exhaust gas aftertreatment system 10 and the combustion engine 2.

Figure 2:
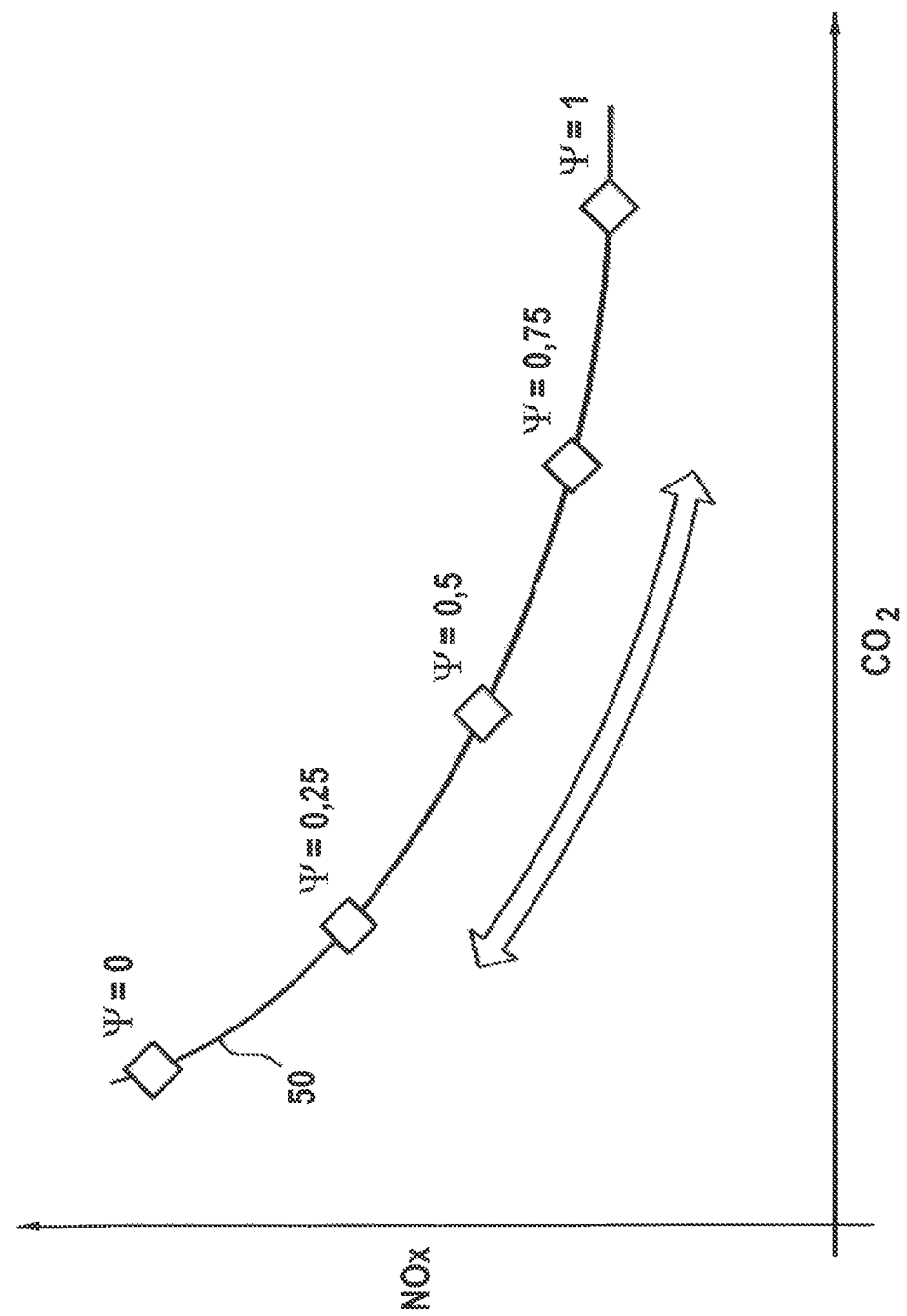
FIG. 2 shows the relationship between nitrogen oxide emissions and carbon dioxide emissions in a diagram.

FIG. 2 shows a diagram, in which nitrogen oxide raw emission (NOx) are plotted against carbon dioxide emissions (CO2). An improvement in the emissions always causes a change of the respective other emissions. In the diagram, a pareto front 50 of the nitrogen oxide emissions and the carbon dioxide emissions is shown that represents the optimum states for both emissions. According to the invention, a weighting factor $\Psi$ is provided, by means of which the weighting between the nitrogen oxide emissions and the carbon dioxide emissions is varied. With the change in the weighting by the weighting factor $\Psi$, it is to be noted that the pareto front 50 is not exited in order to ensure that an optimum state is achieved. The weighting factor $\Psi$ can adopt any value between zero and one. In FIG. 2, individual optimum states on the pareto front 50 with the weighting factors $\Psi=0$, $\Psi=0.25$, $\Psi=0.5$, $\Psi=0.75$ and $\Psi=1$ are emphasised by way of example.

Figure 3:
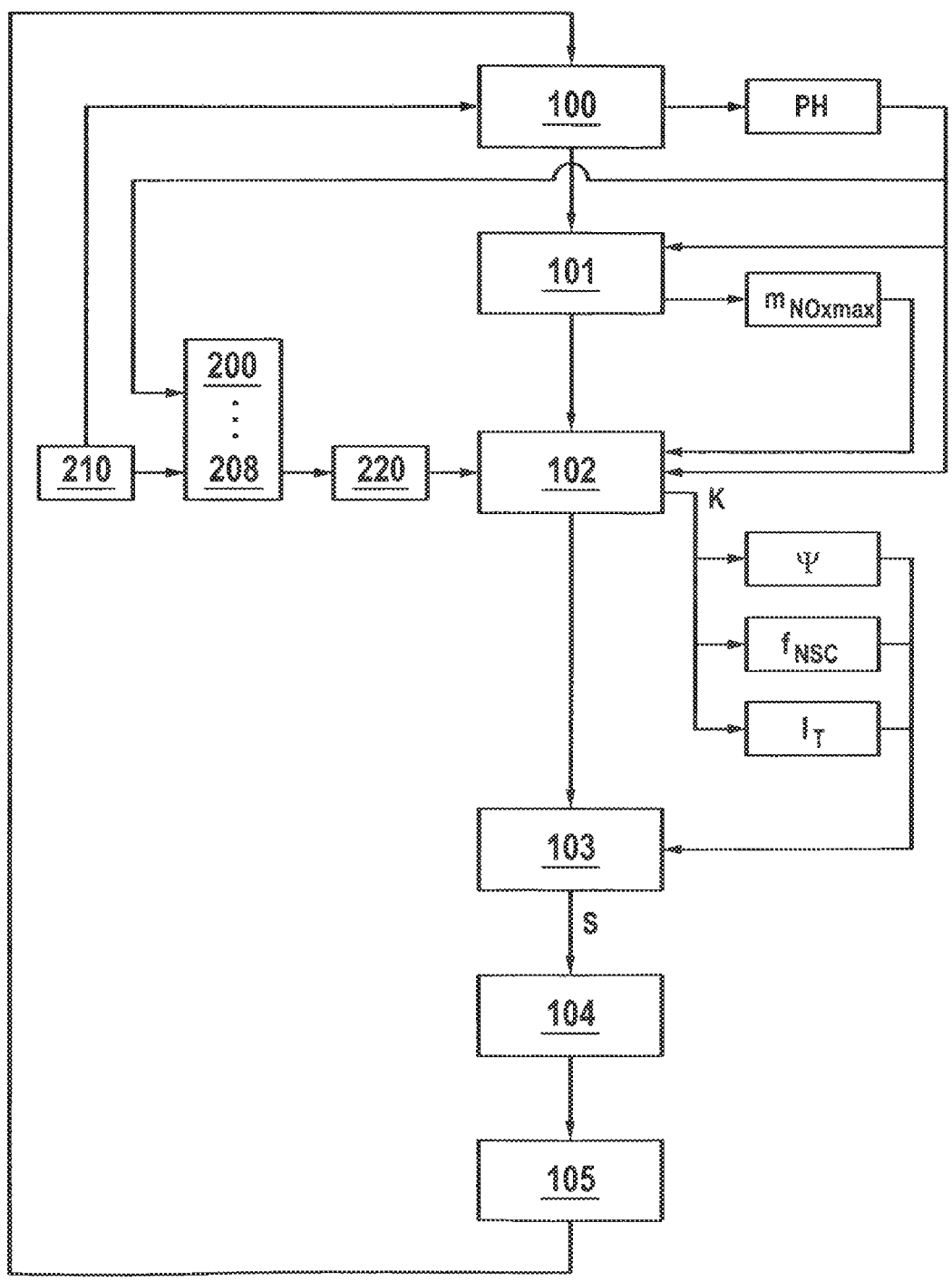
FIG. 3 shows a flow chart of an exemplary embodiment of the method according to the invention.

In FIG. 3, a flow chart of an exemplary embodiment of the method according to the invention is represented. In a first step, a prediction horizon PH is selected 100. The prediction horizon PH is a time window, within which information about future values and/or influencing variables can be obtained, such as for example the nitrogen oxide emissions and the carbon dioxide emissions and/or other harmful emissions, the temperature of the combustion engine 2, the temperature of the exhaust gas and/or the temperatures of the catalytic converters 11, 12, 13, an exhaust gas mass flow $\dot{m}$, the speed of the motor vehicle etc. For a detailed description of the selection 100 of the prediction horizon PH, refer to FIG. 4. In a further step, a nitrogen oxide limit value $m_{NOx\_max}$ is specified 101 using legal limit values for the nitrogen oxide emissions during the prediction horizon PH. In said exemplary embodiment, the nitrogen oxide limit value $m_{NOx\_max}$ is 80 mg/km.

For the current prediction horizon PH, a minimization 102 of a cost function K is carried out as a function of an emission weighting factor ($\Psi$), a correction factor $f_{NSC}$ for the adjustment of a regeneration strategy for the nitrogen oxide storage catalytic converter 11 and an indicator $I_T$ for requesting heating measures for the catalytic converters 11, 12, 13. In order to estimate the effect of the various measures, individual models, a plurality of models or possibly all of the models 200-208 that are described below of the route to be controlled are used:

A model 200 for the carbon dioxide emissions, which is stored in the form of characteristic fields as a function of a load and a revolution rate of the combustion engine 2 and the weighting factors $\Psi$;

a model 201 for the nitrogen oxide emissions, which is stored in the form of characteristic fields as a function of the load and the revolution rate of the combustion engine 2 and the weighting factors $\Psi$;

an oxygen-based model 202 for the nitrogen oxide emissions, which is obtained phenomenologically (alternative to the model 201);

a model 203 for the exhaust gas mass flow $\dot{m}$, which is stored in the form of characteristic fields as a function of a load and a revolution rate of the combustion engine 2 and the weighting factors $\Psi$;

a turbo charger model 204, which is determined from an energy balance;

a model 205 for the exhaust gas temperature, which phenomenologically determines the temperature at the output of the combustion engine 2 as a function of the load and the revolution rate of the combustion engine 2, the temperature of the air/fuel mixture at the input of the combustion engine 2, the temperature of the combustion engine 2, the exhaust gas mass flow $\dot{m}$ and the weighting factors $\Psi$;

a model 206 for calculating the temperature of the catalytic converters 11, 12, 13 based on an energy balance, wherein exothermal reactions are also formed, for example a conversion of unburnt hydrocarbons, as a function of the exhaust gas temperature, the exhaust gas mass flow $\dot{m}$, the speed of the vehicle, and a mass of the hydrocarbons in the exhaust gas, wherein the model 205 in said exemplary embodiment is an explicitly formulated model, i.e. a solution of a basic differential equation;

a model 207 of a nitrogen oxide conversion rate for the nitrogen oxide storage catalytic converter 11;

a model 208 for a nitrogen oxide conversion rate for the SCR catalytic converter 12.

Route information 210 is incorporated in the models 200-208. Said information is determined from navigation data, traffic information and map data, for example. In the present exemplary embodiment, the models 200-208 pass through a low pass filter 210 before being used in the minimization 102 of the cost function K, so that the described variables are incorporated as statistical expected values.

The cost function K is expressed by the following equation 1:

$$K(u(t), t) = \int_{t=0}^{PH} (\dot{m}_{CO_2}(u(t), t) + \delta * m_{NOx}(u(t), t) * \eta_{NSC}(u(t), t) + \Theta(u(t), t)) dt \quad \text{(Equation 1)}$$

In this case, u(t) is a control vector of the combustion engine 2 comprising as inputs the weighting factor $\Psi$, the correction factor $f_{NSC}$ for adjustment of the regeneration strategy for the nitrogen oxide storage catalytic converter 11 and the indicator $I_T$ for requesting heating measures for the catalytic converters 11, 12, 13 as a function of the time t. $\dot{m}_{CO_2}$ and $\dot{m}_{NOx}$ represent the exhaust gas mass flow of carbon dioxide and of nitrogen oxide of the combustion engine 2. $\eta_{NSC}$ represents the storage efficiency of the nitrogen oxide storage catalytic converter 11. $\delta$ is a factor for assessing the regeneration of the nitrogen oxide storage catalytic converter 11 that must be carried out at a later point in time after nitrogen oxide has been stored therein, and then results in an increase in the carbon dioxide emissions. $\delta$ is calculated by forming a moving average from preceding regenerations of the nitrogen oxide storage catalytic converter 11 by setting the carbon dioxide emissions applied during the regeneration in relation to the converted nitrogen oxide mass. $\Theta$ represents a penalty term, by means of which the nitrogen oxide limit value $m_{NOx\_max}$ is taken into account as a boundary condition in the equation 1. Said boundary condition of the nitrogen oxide restriction can be expressed by the following equation 2:

$$\int_{t=0}^{PH} (\dot{m}_{CO_2}(u(t), t) * (1 - \eta_{NSC}(u(t), t) * (1 - \eta_{SCR}(u(t), t)) dt \leq m_{NOx\_max} - m_{NOx\_act} \quad \text{(Equation 2)}$$

$\eta_{SCR}$ is analogous to an efficiency of the SCR catalytic converter 12. $m_{NOx\_act}$ represents the current nitrogen oxide mass and is calculated by continuous integration of the measurement values of the second nitrogen oxide sensor 31 or by integration of model values. A possible violation of the boundary condition specified in the equation 2 is transferred by means of a transfer function into the penalty term $\Theta$ in the equation 1. If the boundary condition specified in the equation 2 is satisfied, the penalty term $\Theta$ in the equation 1 is selected as zero, for example. If the equation 2 is not satisfied, then the penalty term $\Theta$ in the equation 1 adopts a finite positive value that is so large that the corresponding control strategy for the minimization 102 of the cost function K is reliably excluded. For example, the penalty term $\Theta$ can adopt a value that exceeds the other values from equation 1 by a factor of ten.

The minimization 102 of the cost function is carried out using a shooting method or one or more of the following algorithms based on the Bellman optimality principle:
Policy iteration;
Value iteration;
Dynamic programming; and/or
a rollout algorithm.

The minimization 102 of the cost function K and the associated determination of an optimum control vector û(t), is carried out according to equation 3. The optimum control vector û(t) contains as entries the optimum weighting factor $\Psi$ and the correction factor $f_{NSC}$ for adjustment of the regeneration strategy for the nitrogen oxide storage catalytic converter 11 and the indicator $I_T$ for requesting heating measures for the catalytic converters 11, 12, 13, which are implemented in the form of special engine operating modes.

$$\hat{u}(t) = \arg\min_{u \in U} k(u(t), t) \quad \text{(Equation 3)}$$

In the further method, setpoint values S for actuators of the combustion engine 2 are derived 103 from the optimum weighting factor $\Psi$ and the correction factor $f_{NSC}$ for adjustment of the regeneration strategy for the nitrogen oxide storage catalytic converter 11 and the indicator $I_T$ for requesting heating measures for the catalytic converters 11, 12, 13. An additional correction 104 of the setpoint values S is carried out in order to achieve a desired system behaviour under specifiable boundary conditions. Finally, the actuators of the combustion engine 2 are adjusted 105 by means of the setpoint values S. The method is subsequently repeated based on the new system state starting with the selection 100 of the prediction horizon PH in order to optimize the nitrogen oxide emissions and the carbon dioxide emissions.

Figure 4A:
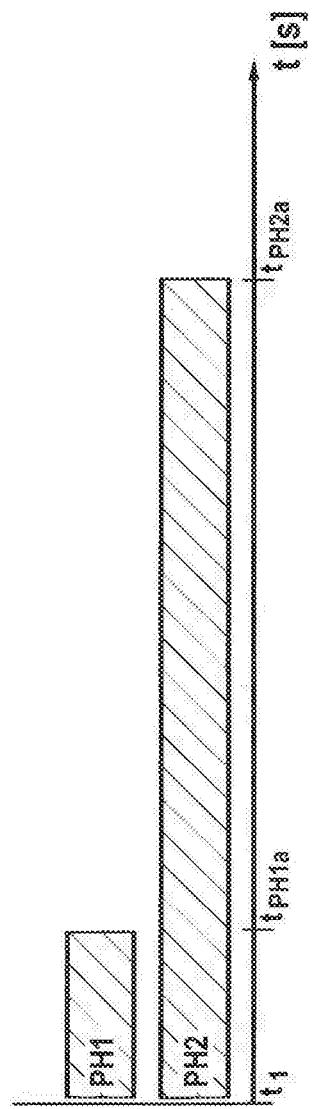
FIGS. 4a to 4c each show two prediction horizons on a timeline.
Figure 4B:
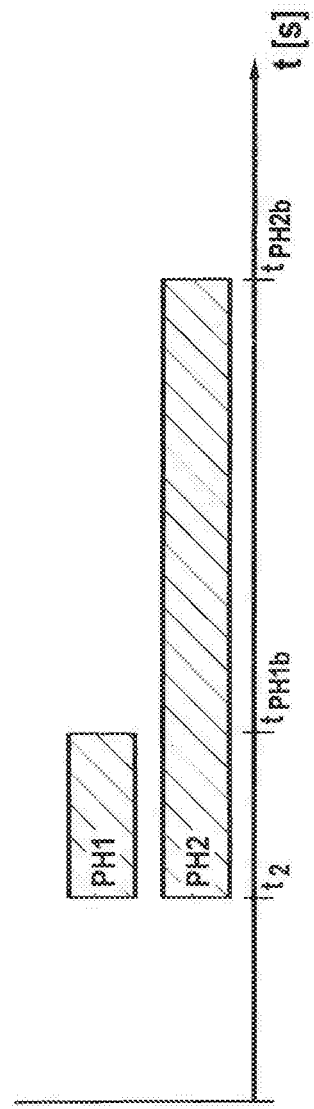
Figure 4C:
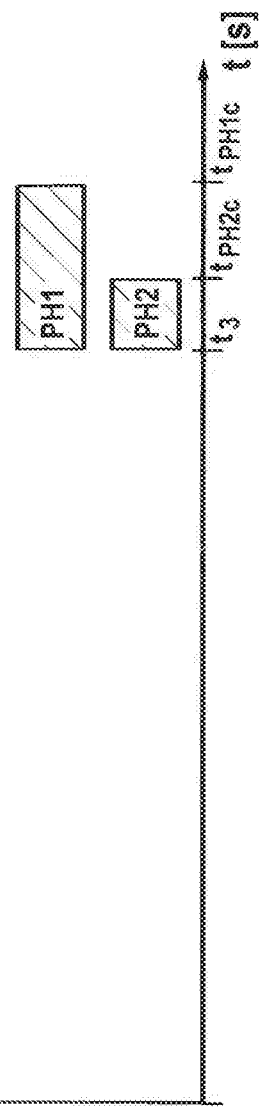

In the FIGS. 4a to 4c, the selection 100 between a first prediction horizon PH1 and a second prediction horizon PH1 for a respective new repetition of the method according to the invention is described using timing diagrams. For the first prediction horizon PH1, a fixed period of time is specified, i.e. it is time-based. The point in time $t_{PH1a}$, $t_{PH1b}$, $t_{PH1c}$ at which the first prediction horizon PH1 ends is equally far from the point in time $t_1$, $t_2$, $t_3$ at which the prediction horizons PH1, PH2 are selected in all timing diagrams. Consequently, the period of time for the prediction horizon during the journey always remains the same. For the second prediction horizon PH2, a length of a route to be traveled is specified, i.e. it is route-based. In order to determine the length of the route, the route information 210, navigation data and/or data stored over preferred routes can be used. Alternatively, a route length can be applied. The route-based prediction horizon PH2 is converted into a period of time by using the average speed of the motor vehicle and/or by using a speed to be expected over the route that is also determined using the aforementioned data. Accordingly, the point in time $t_{PH2a}$, $t_{PH2b}$, $t_{PH2c}$ at which the second prediction horizon PH2 ends remains the same and the period of time is different for each sub diagram, because the route that is still to be traversed is shorter. With one embodiment of the method according to the invention, it is provided to select the prediction horizon PH1, PH2 that ends later. In the cases represented in the timing diagrams 4a and 4b, the route-based second prediction horizon PH2 is therefore selected, because the point in time $t_{PH2a}$, $t_{PH2b}$ at which the second prediction horizon PH2 ends lies further into the future than the points in time $t_{PH1a}$, $t_{PH1b}$ at which the first prediction horizon PH1 ends. In the sub diagram 4c, the opposite case is represented, in which the time-based first prediction horizon PH1 is selected because the point in time $t_{PH1c}$ at which the first prediction horizon PH1 ends is now further into the future than the point in time $t_{PH2c}$ at which the second prediction horizon PH2 ends.

The invention claimed is:

1. A method for simultaneous optimization of nitrogen oxide emissions and carbon dioxide emissions of a combustion engine (2) with an exhaust gas aftertreatment system (10) of a motor vehicle comprising the following steps:
   Selecting (100), via a computer, a prediction horizon (PH, PH1, PH2);
   Specifying (101), via a computer, a nitrogen oxide limit value ($m_{NOx\_max}$);
   Minimizing (102), via a computer, a cost function (K) comprising the nitrogen oxide emissions and the carbon dioxide emissions, wherein the nitrogen oxide limit value ($m_{NOx\_max}$) is complied with, and wherein a violation of the nitrogen oxide limit value ($m_{NOx\_max}$) is taken into account in the form of a penalty term ($\Theta$) in the cost function (K) that adopts a first value if the nitrogen oxide limit value ($m_{NOx\_max}$) is not exceeded and adopts a second value of finite size if the nitrogen oxide limit value ($m_{NOx\_max}$) is exceeded; and
   Adjusting (105) actuators of the combustion engine (2) to a setpoint value (S) determined when minimizing (102) the cost function (K).

2. The method according to claim 1, wherein models (200-208) of the route to be controlled are incorporated in the minimization (102) of the cost function (K).

3. The method according to claim 1, wherein a weighting factor ($\Psi$) is used in order to vary a weighting between the nitrogen oxide raw emissions and the carbon dioxide emissions.

4. The method according to claim 3, wherein during the minimization (102) of the cost function (K) a weighting factor ($\Psi$) is determined that is used when adjusting (105) the actuators of the combustion engine (2).

5. The method according to claim 1, wherein during the minimization (102) of the cost function (K) a correction factor ($f_{NSC}$) for adjustment of the regeneration strategy for a nitrogen oxide storage catalytic converter (11) is determined that is used when adjusting (105) the actuators of the combustion engine (2).

6. The method according to claim 1, wherein during the minimization (102) of the cost function (K) a heating strategy for the catalytic converters (11, 12, 13) is determined that is used when adjusting (105) the actuators of the combustion engine (2).

7. The method according to claim 1, wherein the minimization (102) of the cost function (K) is carried out using at least one selected from the group consisting of a policy iteration, a value iteration, dynamic programming, a rollout algorithm, a shooting method.

8. The method according to claim 1, wherein the prediction horizon (PH1) is based on a specifiable period of time.

9. The method according to claim 1, wherein a prediction horizon (PH2) is based on a specifiable length of a route.

10. The method according to claim 9, wherein the route-based prediction horizon (PH2) is converted into a period of time by using the average speed of the motor vehicle and/or by using a speed to be expected over the route.

11. The method according to claim 1, wherein from a plurality of prediction horizons (PH1, PH2) the prediction horizon is selected that ends furthest into the future.

12. A non-transitory, computer-readable medium comprising a computer program that, when executed by an electronic control unit, causes the electronic control unit to
   select a prediction horizon (PH, PH1, PH2);
   specify a nitrogen oxide limit value ($m_{NOx\_max}$);
   minimize a cost function (K) comprising the nitrogen oxide emissions and the carbon dioxide emissions, wherein the nitrogen oxide limit value ($m_{NOx\_max}$) is complied with, and wherein a violation of the nitrogen oxide limit value ($m_{NOx\_max}$) is taken into account in the form of a penalty term ($\Theta$) in the cost function (K) that adopts a first value if the nitrogen oxide limit value ($m_{NOx\_max}$) is not exceeded and adopts a second value of finite size if the nitrogen oxide limit value ($m_{NOx\_max}$) is exceeded; and
   adjust actuators of the combustion engine (2) to a setpoint value (S) determined when minimizing (102) the cost function (K).

13. An electronic control unit (3) configured to
   select a prediction horizon (PH, PH1, PH2),
   specify a nitrogen oxide limit value ($m_{NOx\_max}$);
   minimize a cost function (K) comprising the nitrogen oxide emissions and the carbon dioxide emissions, wherein the nitrogen oxide limit value ($m_{NOx\_max}$) is complied with, and wherein a violation of the nitrogen oxide limit value ($m_{NOx\_max}$) is taken into account in the form of a penalty term ($\Theta$) in the cost function (K) that adopts a first value if the nitrogen oxide limit value ($m_{NOx\_max}$) is not exceeded and adopts a second value of finite size if the nitrogen oxide limit value ($m_{NOx\_max}$) is exceeded; and
   adjust actuators of the combustion engine (2) to a setpoint value (S) determined when minimizing (102) the cost function (K).

* * * * *